(12) United States Patent
Cazals et al.

(10) Patent No.: US 8,308,108 B2
(45) Date of Patent: Nov. 13, 2012

(54) FUSELAGE ARRANGEMENT FOR AIRPLANE

(75) Inventors: Olivier Cazals, Daux (FR); Jaime Genty de la Sagne, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 316 days.

(21) Appl. No.: 12/494,919

(22) Filed: Jun. 30, 2009

(65) Prior Publication Data
US 2010/0059626 A1 Mar. 11, 2010

(30) Foreign Application Priority Data
Jul. 1, 2008 (FR) ..................................... 08 54459

(51) Int. Cl.
*B64C 1/00* (2006.01)
(52) U.S. Cl. .................. 244/119; 244/102 R; 244/118.1
(58) Field of Classification Search ............... 244/118.1, 244/118.5, 119, 120, 100 R, 102 R
See application file for complete search history.

(56) References Cited

U.S. PATENT DOCUMENTS

| | | | |
|---|---|---|---|
| 1,977,616 A * | 10/1934 | Berliner | 244/119 |
| 4,961,548 A * | 10/1990 | Adams et al. | 244/118.5 |
| 5,544,842 A * | 8/1996 | Smith et al. | 244/1 R |
| 6,497,388 B1 * | 12/2002 | Friend et al. | 244/120 |
| 7,458,542 B2 * | 12/2008 | Chow et al. | 244/102 R |
| 7,618,005 B1 * | 11/2009 | Tafoya | 244/36 |
| 2005/0178900 A1 * | 8/2005 | Quayle | 244/102 R |
| 2007/0164152 A1 * | 7/2007 | Anderson et al. | 244/118.1 |
| 2008/0223984 A1 * | 9/2008 | Guering | 244/102 R |
| 2010/0001129 A1 * | 1/2010 | Guering | 244/102 R |

FOREIGN PATENT DOCUMENTS

| | | |
|---|---|---|
| DE | 10149797 A1 | 4/2003 |
| FR | 2667042 A | 3/1992 |
| FR | 2903661 A | 1/2008 |
| WO | 2008006956 A | 1/2008 |

* cited by examiner

*Primary Examiner* — Christopher P Ellis
*Assistant Examiner* — Medhat Badawi
(74) *Attorney, Agent, or Firm* — Perman & Green, LLP

(57) ABSTRACT

An aircraft fuselage with a shape elongated along a longitudinal axis X along a longitudinal axis of the aircraft that determines a direction toward the front along a direction of motion of the aircraft in flight. A front section with straight cross sections widening relative to the X axis, located at the front of the fuselage and ending in the front of the fuselage in a fuselage nose, and delimited at the rear by a cross section for joining to a rear part of the fuselage behind the front section. The front section includes a cockpit located above a floorboard between a cockpit bulkhead to the rear and a front base to the front.

10 Claims, 3 Drawing Sheets

FUSELAGE ARRANGEMENT FOR AIRPLANE

CROSS-REFERENCE TO RELATED APPLICATIONS

This application claims priority to and the benefit of French Application No. 08 54459 filed on 1 Jul. 2008, the disclosure of which is incorporated herein by reference in its entirety.

BACKGROUND

1. Field

This invention relates to the field of aircraft and more particularly the fuselage of transport aircraft.

More precisely, the invention addresses an aircraft fuselage whose forward section is suitable for reducing the portion of the fuselage necessary for the cockpit and for improving the aerodynamic behavior of the fuselage, and that can be adapted for the extreme forward portion of different types of aircraft.

2. Brief Description of Related Developments

In the domain of modern transport aircraft design, such as civilian passenger or freight transport aircraft, the forward section of the fuselage 1, as shown in FIG. 1, is usually obtained by the gradual tapering of the forward tip 2 of the fuselage in front of a generally cylindrical rear section 3.

The transverse cross sections perpendicular to the longitudinal axis 10 of the fuselage 1 are accordingly progressively reduced to a point 21 with zero cross section, corresponding to the front extremity of the fuselage or the nose of the aircraft.

In practice, the cross sections are defined to satisfy certain technical and design constraints.

In the first place, it is necessary to provide for a cockpit 22 in the forward section 2 of the fuselage, located in the upper part above a floorboard 11, whose dimensions are relatively incompressible because of the technical personnel, pilot, copilot, and navigator, who are stationed there during flight, because of the need to provide for transparent areas, windshield and side windows sufficient to assure visibility compatible with standards, and because of the precise arrangement of the flight instruments.

Secondly, the working structure must be interrupted in front at an area with width and height dimensions sufficient to permit the installation of a radar antenna, most often mobile in current systems, that is covered by a protective radome for aerodynamic reasons in the first place, and that also must not obstruct visibility from the cockpit.

Thirdly, a front landing gear 4 must be positioned in a lower section of the front fuselage, and it is stored in a retracted position inside the fuselage 1, more precisely in a landing gear compartment 41 isolating the pressurized volume of the fuselage from the external unpressurized space, with the landing gear compartment closed off by hatches that assure the aerodynamic continuity of the fuselage in the position with retracted landing gear.

The front landing gear is also positioned on the fuselage in an area as far to the front as possible, for reasons of loading the front wheel relative to the principal landing gear located in an area of the aircraft farther to the rear.

Finally, beneath the floorboard 11 of the cockpit 22 and of the cabin 12 for the passengers or for any load, if needed there are equipment compartments 13 in front of cargo compartments 15, the necessary volume of which in practice is adapted by making a compartment more or less long to accommodate installation of all of the necessary equipment, which is of two principal types: technical equipment to monitor the aircraft, to conduct the flight and the mission, and equipment for commercial application to manage the services for the cabin passengers: lighting, temperature control, audio and video systems, meals, toilets, etc . . .

In practice, respecting numerous constraints imposes compromises on the geometry of the front fuselage, on the development of its cross sections, and on the apportionment of the different interior spaces and volumes, which have the effect of limiting the aerodynamic performance of the fuselage 1, by a relatively low position of the radome relative to the axis of the fuselage and by an elongation of the space occupied by the cockpit and the equipment compartments, and of generating industrialization constraints for the manufacture of the aircraft.

SUMMARY

This invention proposes an aircraft fuselage with a shape elongated along a longitudinal X axis, essentially along a longitudinal axis of the aircraft that determines a direction toward the front along a direction of motion of the aircraft in flight, that comprises a front section with straight cross sections widening relative to the X axis, located at the front of the fuselage, ending at the front of the fuselage in a fuselage nose, and delimited at the rear by a cross section for joining to a rear part of the fuselage behind the front part.

The said front section comprises a cockpit, located above a floorboard between a cockpit bulkhead to the rear and a front base to the front.

To improve the aerodynamic behavior and the industrial production of the aircraft fuselage, lower shapes of the front section determine a lower bulge such that a lower profile of the fuselage, in other words a characteristic line of an intersection between a vertical plane of symmetry of the aircraft and a lower external surface of the fuselage, have:

simple curvature between the nose of the fuselage and the cockpit bulkhead, and double curvature between the cockpit bulkhead and the joint cross section, so that the lower profile has a local extreme downward at a straight intermediate cross section between the cockpit bulkhead and the joint cross section.

Despite increasing the volume of the lower fuselage, the maximum widths of the straight cross sections of the front section increase from the nose of the fuselage to the joint cross section and show no lateral enlargement of the fuselage that would be prejudicial to the aerodynamic drag.

To promote laminar aerodynamic flow around the front section of the fuselage and to reduce drag, the upper shapes of the front section determine an upper profile of the fuselage, in other words a line characteristic of an intersection between the vertical plane of symmetry of the aircraft and an exterior upper surface of the fuselage, which shows simple curvature between the nose of the fuselage and the intermediate cross section, with the upper profile essentially symmetrical with respect to the axis with the lower profile between the nose of the fuselage and the intermediate cross section. This symmetry and these shapes impart a general ovoid shape to the fuselage in front of the lower bulge.

The optimal apportionment of the volumes in the front section of the fuselage permits arranging an electronics cabinet devoted to the technical applications associated with the cockpit in a lower space on the fuselage below the floorboard between the cockpit bulkhead and the front base, and an electronics cabinet devoted to commercial applications associated with a passenger or cargo cabin in a lower space on the fuselage below the floorboard behind the cockpit bulkhead.

Considering the apportionment obtained and the possible separation of technical and commercial functions, a portion of the fuselage between the nose of the fuselage and essentially the cockpit bulkhead determines a first section of fuselage comprising the cockpit and the electronics cabinet devoted to technical applications, and a portion of the fuselage essentially between the cockpit bulkhead and the joint cross section determines a second section of fuselage comprising the electronics cabinet devoted to commercial applications.

The front section of the fuselage with widening cross sections is then the result of the assembly of the first and second sections at the cockpit bulkhead.

To integrate the front landing gear in the fuselage without penalizing the volumes available for the various compartments, technical cabinets beneath the cockpit, cabinet for commercial equipment behind the cockpit bulkhead, the compartment for cargo beneath the floorboard of the cabin, the front landing gear and the associated landing gear compartment are made in the second section of fuselage and close to the lower bulge, the volume of which lends itself to producing a front landing gear that has a relatively short landing gear strut and a relatively short associated landing gear compartment.

To improve the integration of the cockpit and to reduce the length of fuselage devoted to the cockpit, it is advantageous for the front base to have an upper part inclined toward the front of the aircraft at a cockpit instrument panel.

In order to avoid angular joints at the joint cross section that would be sources of disturbances of the aerodynamic flow on the fuselage, tangents to the surfaces of the fuselage of the front section and of the rear section coincide at every point of the joint cross section.

In one embodiment, the rear section is essentially cylindrical.

The invention also relates to a method for producing an aircraft fuselage in which a second section is made as a function of the cross section for joining to the rear section and of characteristics of the aircraft, a function of the model of aircraft to be manufactured, and to which is assembled a first section (7), which first section is essentially independent of the model of aircraft to be manufactured.

The invention relates to any aircraft that has such a fuselage.

DESCRIPTION OF THE DRAWINGS

A detailed embodiment of the invention is described with reference to the Figures, which show.

DESCRIPTION OF THE DISCLOSED EMBODIMENTS

Figure 2:
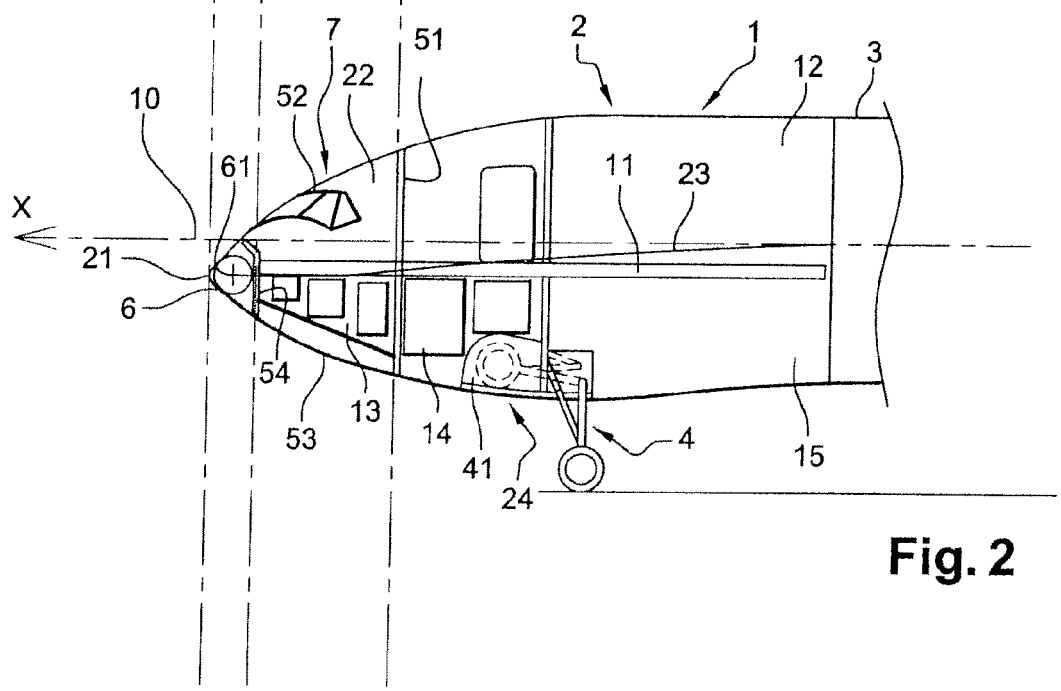
FIG. 2: a schematic view of a cross section of the front fuselage of an aircraft according to the prior art.

As shown in FIG. 2, an aircraft fuselage 1 according to the invention comprises a front section 2 relative to the direction of motion of the aircraft in flight, with straight cross sections widening relative to a longitudinal axis X 10 of the fuselage and that connects at a joining cross section 31 to a rear section 3 that advantageously is essentially cylindrical or whose cross sections are slightly widening relative to the front section 2, said rear section most often being cylindrical with circular cross section or formed of a plurality of lobes, or elliptical, located to the rear of the front section 2 in the case of current transport aircraft.

At the joint between the front section 2 and the rear section 3, the tangents to the surfaces of the fuselage of the front section 2 and the rear section 3 coincide at every point of the cross section of the joint 31 so as not to create joining angles at the exterior surface of the fuselage, which would be prejudicial to the quality of the aerodynamic flow in flight.

The axis 10 corresponds essentially in height to the line of greatest width of the rear section 3, for example at mid-height of the fuselage in the case of a cylindrical rear section with circular cross section.

Figure 1:
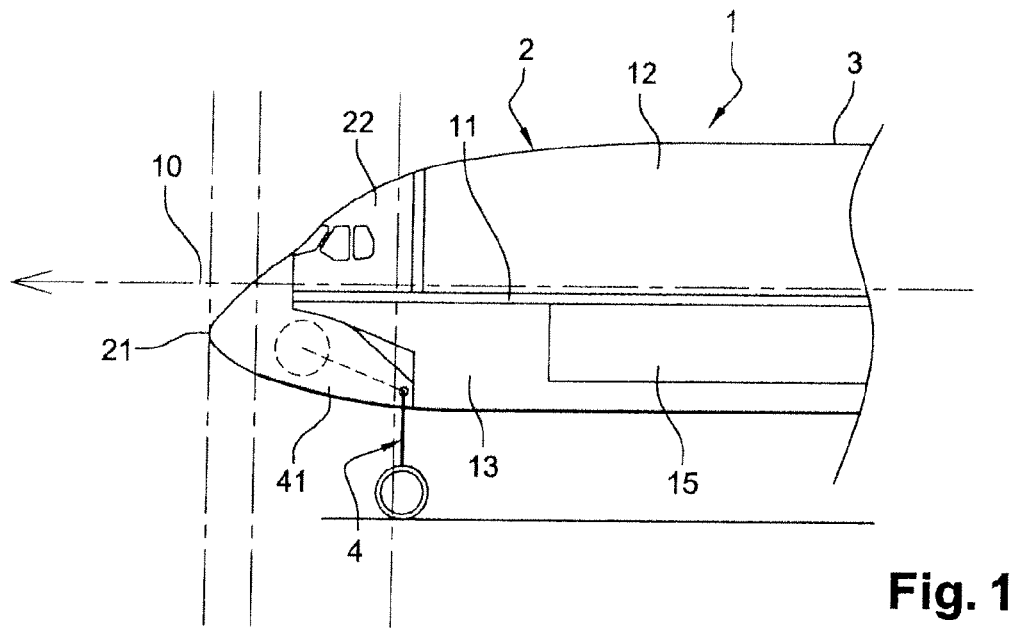
FIG. 1: a schematic view of a cross section of the front fuselage of an aircraft according to the prior art.

The fuselage pursuant to the invention shown in FIG. 2 is represented essentially on the same scale as the fuselage pursuant to the prior art shown in FIG. 1, with similar parts being identified by identical labels on the two fuselages.

In the present description unless otherwise specified, the terms fuselage shape, profile or line of the fuselage, refer to an exterior surface of the fuselage 1, in other words the surface of the fuselage in contact with the aerodynamic flow when the aircraft is in flight.

The front section 2 pursuant to the invention comprises an extreme front part 7 of the fuselage located forward of a longitudinal position along the longitudinal axis X of the fuselage corresponding to a separation, for example at a fuselage bulkhead called the cockpit bulkhead 51, between a forward space devoted to a cockpit 22 and a rear space devoted to a cabin 12 for passengers or for cargo.

Upper shapes of the front section 2 above a floorboard 11 are determined in practice by the dimensions of the cockpit 22, and determine the lines along the longitudinal direction, principally along the longitudinal direction X, supported on a forward base 54, on the cockpit bulkhead 51, and at a joint with the rear section 3 on an upper part of a cross section 31 of the rear section 3.

The said upper shapes determine an upper profile 52 for the extreme forward section 7 giving rise to a fuselage nose 21 and continuing above the cockpit to rejoin the upper part of the rear section 3 behind the cockpit bulkhead 51.

Preferably, as shown in FIG. 2, the upper profile 52 shows a simple curvature that connects tangentially to the rear section 3 and characterizes a development as regular as possible of the cross sections of the fuselage in its upper part, so as to favor laminar aerodynamic flow characteristics around the fuselage in flight over the greatest longitudinal distance behind the nose 21 of the fuselage.

The position along the longitudinal axis X of the nose 21 of the fuselage relative to the cockpit bulkhead 51 determining the space of the fuselage 1 devoted to the cockpit 22 is itself such that the upper profile 52 permits the installation of a radar antenna 61 in a radome 6 forward of the forward base 54, a constraint that imposes on the fuselage nose 21 a position in height along an axis Z of the vertical plane of symmetry of the fuselage.

In the case of a so-called single-bridge fuselage, in other words one that comprises a single floorboard 11 separating a cockpit space 22 and upper cabin 12 from a lower storage compartment 14, the nose 21 of the fuselage is located in practice along the Z axis, considering the heights of the cabin and storage compartment spaces below the axis 10 of the rear section 3 of the fuselage located between an upper profile and a lower profile of the said rear section.

Lower shapes of the forward section 2 beneath the floorboard 11, at least forward of the cockpit bulkhead 51, are such that a lower profile 53 of the extreme front section 7 is essentially symmetrical with respect to an axis parallel to the X axis passing through the nose 21 of the fuselage.

This characteristic confers upon the fuselage in its forward section an ovoid shape visible in FIG. 2, which favors laminar aerodynamic flow.

Preferably a line of greatest width of the fuselage 23 between the upper profile 52 and the lower profile 53 tends progressively to rejoin a horizontal plane that comprises the axis t10 of the fuselage, but this tendency is limited in the extreme front section 7; because of the essentially symmetrical shape of the upper profile 52 and the lower profile 53 forward of the cockpit bulkhead 51 and the required shape of the upper profile 52, the lower profile 53 rapidly converges toward the cross section of the joint with the rear section 3 to the rear of the cockpit bulkhead 51, and as shown in FIG. 2 for the case of a fuselage 1 whose rear section 3 has a relatively small height along the Z direction between an upper profile and a lower profile of the said rear section, the lower profile 53 of the fuselage in the front section 2 comprises a part below the lower profile of the rear section 3 of the fuselage, with the said section characterizing a lower bulge 24 of the front fuselage.

At the position of the lower bulge 24, the position the farthest from the axis of the lower profile 53 corresponds to an intermediate cross section 55 with maximum extension toward the bottom, which determines a local extreme of the lower profile, and the lower profile then shows a simple curvature between the nose 21 of the fuselage and the cockpit bulkhead 51, with the simple curvature extending to beyond the intermediate cross section 55, and a double curvature between the intermediate cross section 55 and the joining cross section 31, with the double curvature being necessary to connect the surface of the front section 2 with that of the rear section 3 without any ridge in a lower section of the fuselage.

As a consequence, the lower profile 53 shows a tangent essentially parallel to the axis 10 of the fuselage in the area of the intermediate cross section 55, a tangent parallel to the tangent of the lower profile of the rear section 3 in the area of the joining cross section 31, and a curvature inflection point between the intermediate cross section and the joining cross section.

This configuration of the lower profile 53 is reproduced for the profiles of the lower part of the fuselage located between the lower profile and an intermediate profile located between the lower profile and the profile corresponding to the line 23 of the maximum width of the fuselage, corresponding to a profile passing through a point 56 on the intermediate cross section 55 and a point located essentially at the same height of the joining cross section 31, the distances of which from the vertical aircraft plane of symmetry are essentially the same.

Figure 5A:
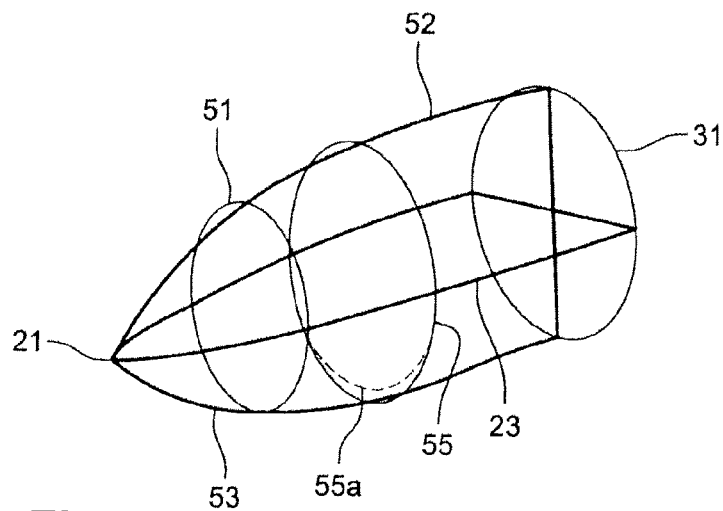
FIGS. 5a and 5b: an illustration of the lines of the front section of the fuselage for different transverse cross sections and along the longitudinal cross sections, in perspective in FIG. 5a and in front view in FIG. 5b.
Figure 5B:
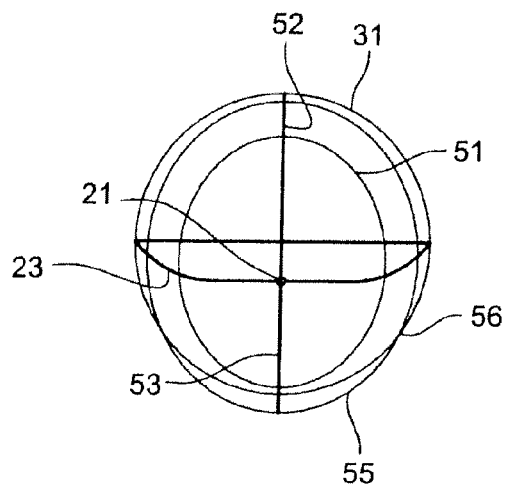
Figure 6:
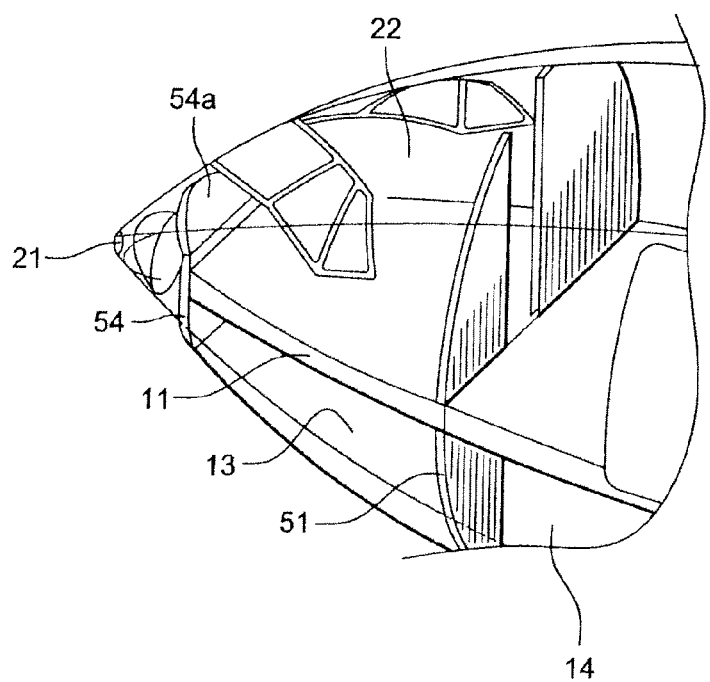
FIG. 6: a perspective view, partly broken away, of the principal elements of the extreme front point.

As shown in FIGS. 5a and 5b, in the area of the cross section 55 with maximum lower extension, the maximum width of the fuselage, illustrated by the line 23 in the area of the said cross section, is essentially the same width as a section not applying the principles of the invention, such as the cross section 55a shown as a broken line in FIG. 5a.

As advantages derived from these shapes of the front fuselage will be understood, it should be understood that the said shapes are obtained by the working structure of the fuselage so that the internal volumes and the structures for absorbing the different stresses to be introduced into the fuselage benefit from the singular shapes of the fuselage pursuant to the invention.

In particular, if such forms were sought by means of aerodynamic streamlining produced on a fuselage of conventional shape, the advantages expected from the invention would not be obtained.

Thus, the unconventional shape of the forward section of the fuselage according to the invention characterized by such upper and lower profiles is associated beneficially with singular characteristics concerning the structure of the forward section of the fuselage 2, the implanting of a front landing gear 4, and the arrangement of electronics cabinets 13, 14.

According to the proposed arrangement, the front landing gear 4 is placed along the X direction so that the said front landing gear as well as a landing gear compartment 41 are located behind the cockpit bulkhead 51.

The front landing gear 4, retractable a priori, is retracted into the landing gear compartment 41 toward the front, as shown in FIG. 2, or toward the rear, a case not shown, so that the extreme front section 7 of the fuselage forward of the cockpit bulkhead 51 is not affected by the said landing gear or its installation.

This arrangement of the front landing gear 4 has the benefit of transporting the points of uptake of the said front landing gear on the fuselage 1 into an area of the said fuselage closer to the ground when the aircraft is grounded, because of the lower profile 53 more distant from the axis of the fuselage in the area of the bulge 24, and accordingly of permitting a shorter and thus lighter landing gear for equivalent strength.

Actually, if the front landing gear were fastened in an area of the fuselage 3 behind the bulge 24, for example near the joining cross section 31 at which the height of the fuselage is reduced, the necessity of transferring the stresses on the landing gear to the structure of the fuselage would impose a longer strut on the landing gear to maintain the height of the fuselage relative to the ground.

This arrangement of the front landing gear 4 frees up space beneath the floorboard 11 in the extreme front section 7, below the cockpit 22, generally utilized as electronics cabinets.

The position of the landing gear farther to the rear provides a first benefit at this point by totally freeing the volume available for the electronics cabinet forward of the cockpit bulkhead 51, and of making it easier to organize this volume and accordingly to arrange the cockpit and the associated electronics cabinet in a more rational manner.

The distancing of the front landing gear has a second benefit in reducing the level of vibration generally encountered in the front electronics cabinet 13 while taxiing, and of limiting the risk of damage to equipment in case of a flat tire.

Also, because of the bulge 24, the volumes available beneath a floorboard of the cargo compartment 15 are sufficient to integrate the front landing gear 4 in the lines of the fuselage without the necessity of reducing the volume of the said cargo compartment in order to place in the fuselage the landing gear compartment 41, which is shorter along the X direction on the one hand because of a shorter front landing gear, and on the other hand because it penetrates less into the volumes provided in the fuselage because of a lesser inclination of the front landing gear in the position retracted to the interior of the landing gear compartment.

Figure 3:
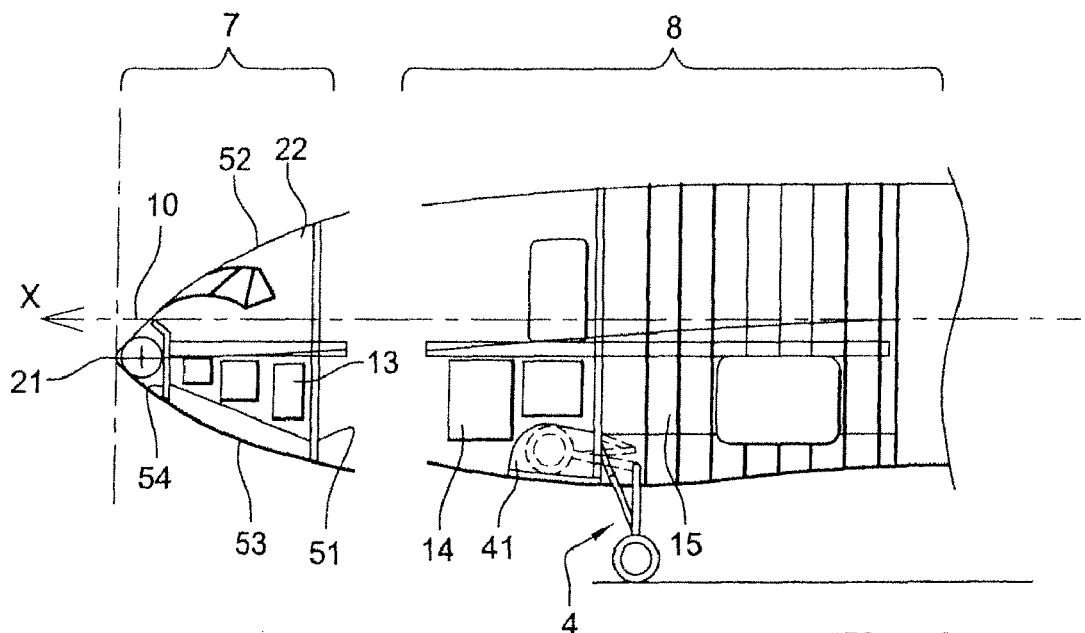
FIG. 3: a schematic view of a cross section of the front fuselage illustrating an extreme front point detached from the front section of the fuselage.
Figure 4:
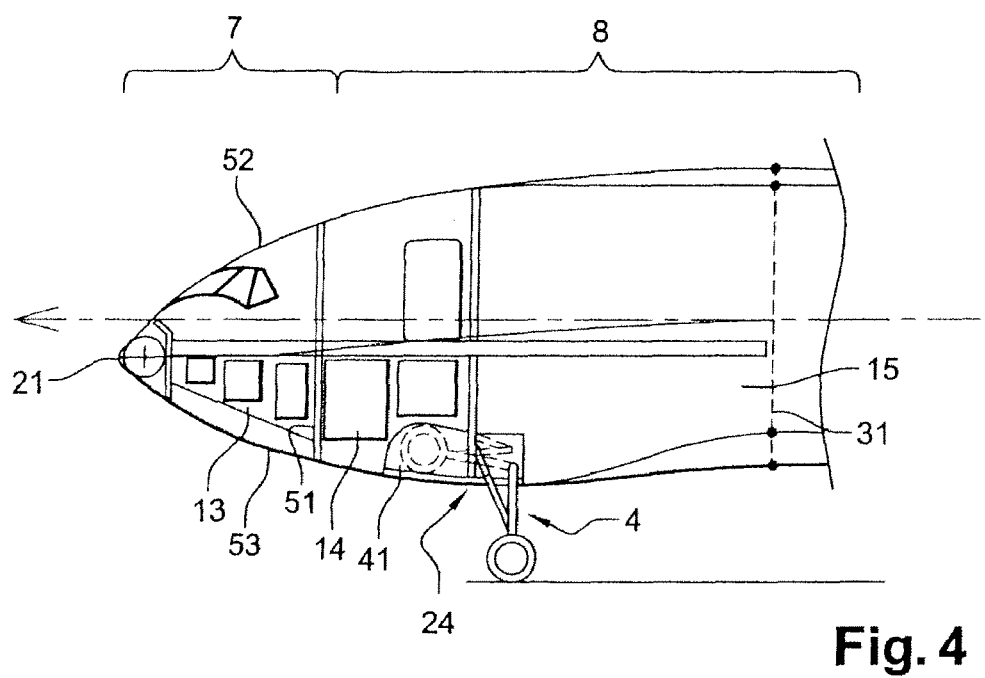
FIG. 4: a schematic view of a cross section of the front fuselage illustrating the joining of the front point to different shapes of fuselage.

The front landing gear 4 is thus partly beneath the cargo compartment 15 and beneath the rear electronics cabinet 14, as shown in FIGS. 2, 3, and 4, or totally beneath the cargo compartment 15, a case not shown.

The forward electronics cabinet 13 combines to the extent possible the various equipment devoted to the technical functions of the aircraft and associated with the cockpit 22.

The shape of the fuselage in the forward section 2 also has the effect of creating a volume for the rear electronics cabinet 14 behind the cockpit bulkhead 51 that is increased in height relative to a lower profile of a conventional fuselage.

According to the fuselage of the invention, this volume of the rear electronics cabinet 14 is used to combine system electronics equipment linked to the cabin space 12, with the increased height of the rear electronics cabinet being advantageously utilized to reduce the length in the longitudinal direction of the said cabinet, and consequently to increase the volume of the cargo compartment 15 for transporting loads of merchandise behind the rear electronics cabinet 14.

Because of the separation of the volumes of electronics cabinets 13, 14, and of the position of the front landing gear 4 made possible by the forward shapes of the fuselage of the invention, it is possible to produce fuselage elements or sections to be assembled in an industrial process to produce a fuselage, facilitating the integration of systems in the structure in the fuselage elements before assembly.

In particular, pursuant to an aspect of the disclosed embodiments, as shown in FIG. 3, a first section of fuselage is formed by the extreme front section 7, in other words entirely or partly the structure and the aircraft systems located essentially in front of the cockpit bulkhead 51.

The said structure and the said systems are associated with the cockpit and with the techniques of piloting and flight management comprising numerous invariants, and which in practice depend little or not at all on the outline of the structure and the installations of the systems of the type of aircraft under consideration, in other words in an industrial manufacturing process for aircraft and in particular families of aircraft comprising different models, the extreme front section has a high level of commonality between different aircraft, which makes the said extreme front section generic to some extent, relative to the aircraft families being considered.

This high level of commonality applies especially to the structural design, because the front landing gear 4, the structure of which depends obviously on the model of aircraft, particularly because of the weight characteristics of the aircraft, is displaced relative to a conventional aircraft into a zone behind the cockpit bulkhead 51 and accordingly does not affect the extreme front section.

This high level of commonality is also not affected by the assembly of identical extreme forward sections 7 with fuselages with different cross sections for connection 31 with the rear section 3 as shown in FIG. 4.

In such cases of different joining cross sections, the shapes of a second section 8 of fuselage corresponding to the front section of the fuselage with widening cross section located between the cockpit bulkhead 51 and the rear section 3 of the fuselage are adapted to connect to the said rear section of the fuselage, specifically by adapting the upper and lower profiles 52 and 53 as well as the line of greatest width of the fuselage 23, which makes the said second section a section specific for the model of aircraft under consideration.

Such specific second sections 8 with different geometric shapes are also specific in structures and in systems, depending on the model of aircraft because of characteristics of the front landing gear and of configuration of the rear electronics cabinet 14 that are a priori different to meet the different needs for arranging the cabin 12 and the cargo compartment 15.

However, the arrangement of the rear electronics cabinet 14 remains independent of that of the forward electronics cabinet 13.

The shapes of the extreme front section 7, freed of the constraints for integration of the front landing gear, permits the construction of a shorter cockpit without modifying the visibility of the pilots in the cockpit 22, in particular by means of a forward base 54 that has an upper part 54a inclined toward the front, shown in FIGS. 2 to 5, in a high section for the integration of a control instrument panel as far to the front as possible.

Producing a shorter cockpit, in particular made possible by a position of the front landing gear farther to the rear according to the invention, permits the construction of an aircraft with smaller dimensions and less weight with the same missions, or an aircraft with improved missions and the same total weight and dimensions.

In an example of embodiment of an aircraft whose fuselage is about 5 meters in diameter in a cylindrical part with circular cross section, the following benefits have been identified by implementing the invention in comparison with a conventional method:
- possible reduction of the length of the fuselage by about 0.4 m;
- reduction of the length of the front landing gear by about 0.4 m;
- surface area of pressurized structure of the landing gear compartment of about 30%;
- surface area of the closing hatches of the landing gear compartment of about 30%;
- with these benefits being realized without reducing the useful volumes of the cockpit and of the compartments.

The invention also permits the production in one manufacturing step of a forward section of fuselage of a model of aircraft adaptable to different cross sections of rear fuselage by assembly on the one hand of a first extreme forward section corresponding to the area of the cockpit that depends relatively little on the model of aircraft, and on the other hand of a second section intermediate between the first section and an intermediate section of fuselage that has particular characteristics dependent on the model of aircraft.

The invention claimed is:

1. An aircraft fuselage elongated along a longitudinal axis of an aircraft that determines a direction toward a front of the aircraft along a direction of motion of the aircraft in flight, comprising:
   a front part with straight cross sections widening relative to the longitudinal axis,
   said front part ending in front with a fuselage nose and being delimited at a rear by a joining cross section similar to a cross section of a rear part, essentially cylindrical of the fuselage,
   said front part comprising a cockpit located above a floorboard between a cockpit bulkhead to the rear and a front wall at the front, wherein lower shapes of a working structure of the front part determine a lower bulge such that each straight cross section of the working structure of the fuselage has a single curvature rounded shape and such that a lower profile of the working structure of the fuselage, corresponding to an intersection between a vertical plane of symmetry of the aircraft and an exterior surface of the fuselage comprises:
       a simple curvature between the fuselage nose and the cockpit bulkhead, and curvature inversion between the cockpit bulkhead and the joining cross section so that the lower profile has a local extremum at the bottom, said local extremum determining an intermediate cross section between the said cockpit bulkhead and the said joining cross section, and wherein upper shapes of the front part determine an upper profile of the fuselage said upper profile, between the fuselage nose and the intermediate cross section, having a simple curvature and being essentially symmetrical, with respect to an axis parallel to the longitudinal axis and passing through the fuselage nose, imparting a general ovoid shape to the fuselage in front of the lower bulge.

2. The aircraft fuselage pursuant to claim 1 in which the maximum widths of the straight cross sections of the front part are increasing from the nose of the fuselage to the joint cross section.

3. The aircraft fuselage pursuant to claim 2 comprising an electronics cabinet devoted to technical applications associated with the cockpit in a lower space of the fuselage below the floorboard between the cockpit bulkhead and the forward base.

4. The aircraft fuselage pursuant to claim 3 comprising an electronics cabinet devoted to commercial applications associated with a passenger or cargo compartment in a lower space of the fuselage below the floorboard behind the cockpit bulkhead.

5. A method for manufacturing an aircraft fuselage pursuant to claim 1 comprising assembling a first part of fuselage with a second part of fuselage, said first part of the fuselage corresponding to a portion of fuselage between the nose of the fuselage and the cockpit bulkhead and comprising the cockpit and an under cockpit floor electronics cabinet devoted to technical applications, and said second part of the fuselage corresponding to a portion of fuselage between essentially the cockpit bulkhead and the joining cross section and comprising an under cabin floor electronics cabinet devoted to commercial applications.

6. The aircraft fuselage pursuant to claim 1 comprising a front landing gear and a front landing gear compartment provided inside the working structure of the second part of fuselage, in the proximity of the lower bulge.

7. The aircraft fuselage pursuant to claim 6 in which the points for attaching the front landing gear to the working structure of the fuselage are located in the fuselage inside the bulge.

8. The aircraft fuselage pursuant to claim 1 in which the front wall comprises an upper part inclined toward the front of the aircraft in front of a cockpit instrument panel.

9. The aircraft fuselage pursuant to claim 1 in which tangents of the surfaces of the fuselage of the front part and of the rear part coincide at every point of the joining cross section to have a junction between said front and rear parts without angular connection.

10. A method for manufacturing an aircraft fuselage pursuant to claim 5 in which the second part of fuselage is selected between at least two different models of second parts of fuselage, said at least two second parts of fuselage having a same cross section to be assembled to the first part of the fuselage and having a different joining cross section.

\* \* \* \* \*